United States Patent [19]

Nelles

[11] Patent Number: 5,007,467
[45] Date of Patent: Apr. 16, 1991

[54] METHOD AND APPARATUS FOR PRODUCING CATHODES FOR DRY-CELL BATTERIES, ESPECIALLY LITHIUM BATTERIES

[75] Inventor: Josef Nelles, Meschede, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 412,666

[22] Filed: Sep. 26, 1989

[30] Foreign Application Priority Data

Jun. 29, 1989 [DE] Fed. Rep. of Germany ....... 3921288

[51] Int. Cl.$^5$ .................. H01M 4/72; H01M 4/82
[52] U.S. Cl. .................................. 141/1.1; 141/32; 29/2
[58] Field of Search ............... 141/1, 1.1, 32; 29/2, 29/623.1, 623.5

[56] References Cited

U.S. PATENT DOCUMENTS

1,611,631 12/1926 Campbell .................. 141/32
3,621,543 11/1971 Willman et al. ............ 29/2
3,951,688 4/1976 Pankow et al. .......... 141/1.1
4,271,586 6/1981 McCartney, Jr. ........... 29/2
4,318,430 3/1982 Perman ................. 141/32
4,606,383 8/1986 Yanik .................. 141/32

Primary Examiner—Henry J. Recla
Assistant Examiner—Keith Kupferschmid
Attorney, Agent, or Firm—Robert W. Becker & Associates

[57] ABSTRACT

An automatically operating apparatus and method for producing cathodes for dry-cell batteries, especially lithium batteries. A strip-like carrier material to which cathode material is fed in a dosed manner is transported on an endless, continuously rotating conveyor belt system. After passing a pasting mechanism, which includes a roller, and after passing a possibly provided cleaning mechanism for exposing the contact locations for the current shunting, the cathode material subsequently passes into a pressing mechanism that includes two rotating belts. Following the pressing mechanism is a cutting device that, just like the cleaning mechanism, moves synchronously with the conveyor belt system during processing, and that cuts the carrier material in conformity with the cathode lengths. Subsequently, the current shuntings are attached.

7 Claims, 5 Drawing Sheets

METHOD AND APPARATUS FOR PRODUCING CATHODES FOR DRY-CELL BATTERIES, ESPECIALLY LITHIUM BATTERIES

BACKGROUND OF THE INVENTION

1. Field of the Invention

The present invention relates to a method and apparatus for producing cathodes for dry-cell batteries, especially lithium batteries, whereby a pasty cathode material is pasted onto a metallic carrier material and is subsequently compressed therewith, with a current shunting being welded to an end of the carrier material.

2. Description of the Prior Art

Dry-cell batteries, i.e. nonaqueous cells, are known. In a winding-type of construction, the components, namely the electrodes and separators are superimposed upon one another as long strips and are turned to form a fixed spirally wound unit. In order to be able to produce a high-output battery, lithium in the form of a lithium foil is used as the anode. Manganese dioxide ($MnO_2$) can be used as the cathode, so that a high-output $Li/MnO_2$ system is obtained, with an organic electrolyte being used in which a lithium compound is dissolved as a conductive salt.

Whereas for the anode it is merely necessary to provide an appropriate metallic foil, it is more difficult to produce the cathodes for the battery, since especially $MnO_2$ does not exist as foil, but rather as a substance that has to be applied to a metallic carrier material in order in this manner to obtain a solid cathode. In so doing, the goal is to apply the pasty cathode material onto the carrier material in a constant thickness and density, to compress the same during a fixed time period, and subsequently to provide a current shunting, whereby attention must be paid to not overstress the carrier material during manufacture. A metal mesh preferably serves as carrier material.

The production of cathodes has up to now been accomplished manually. In so doing, the carrier material, in the form of a metal mesh, is first cut to the appropriate cathode lengths and is disposed in a pasting track after first a paper strip has been provided for absorbing moisture. A weighed amount of the pasty cathode material is then manually pasted onto the carrier material, and the thus prepared cathode is subsequently compacted under a hydraulic press. Finally, after the compressing, the contact locations on one or both ends of the compacted cathode are cleaned, so that the current shuntings, which are connection strips of metal, can then be manually welded on via a spot welding procedure.

Such manually produced cathodes are not of uniform quality, so that large manufacturing tolerances and a large number of rejects are noted. Furthermore, the quantity of cathodes required can be produced only with great personnel expenditure as well as a large number of apparatus, especially for the compression.

It is therefore an object of the present invention to provide both an improved method as well as an improved apparatus for producing cathodes for dry-cell batteries, especially lithium batteries.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention is characterized by the steps of: continuously unrolling a strip-like carrier material from a supply roll, automatically feeding a dosed or metered quantity of the pasty cathode material to the carrier material and subsequently pasting this cathode material onto the carrier material, subsequently, while continuously transporting the pasted carrier material further, automatically compressing the same, subsequently, while still continuously transporting the pasted carrier material further, cutting the same to predetermined cathode lengths, and finally automatically connecting the current shunting to the carrier material.

In this way, there is provided a continuously operating, automated process for producing dry-cell battery cathodes, with this process operating economically and furthermore producing cathodes with great uniformity that are exactly within the required tolerance range without the expectation of a large number of rejects. The automation of the operating steps leads to a considerable savings in personnel as well as to the aforementioned uniformity or consistency in quality. The basic premise of the inventive method is the continuous transport of the carrier material through the cathode-producing apparatus, and in so doing successively carrying out in individual processing stations the operating steps that are necessary for the production. Thus, to begin with, the pasty cathode material is automatically fed in a dosed or metered manner to the carrier material, i.e. as a function of the quantity of the supply of cathode material that is present ahead of the pasting station. At the conclusion of all of the process steps, a finished cathode emerges that can be used for the production of the dry-cell batteries and that can be wound up together with the anode foil and the separator that is disposed between them.

In one preferred embodiment of the inventive method, the pasty cathode material is cyclically supplied to the strip-like carrier material as measured strips, with the feeding or supply operation being effected transverse to the direction of travel of the carrier material. In this way, the carrier material can be optimally dosed with the cathode material, with a new measured strip always being delivered to the strip-like carrier material when it is needed, which can, for example, be controlled by a monitoring device disposed ahead of the subsequent pasting zone.

To produce the measured strips, the same are preferably cut.

Pursuant to a further specific embodiment of the inventive method, it is furthermore proposed that between the pasting and compressing zones, cathode material be removed from the pasted carrier material in conformity with the cathode length in the vicinity of the cutting location, and the carrier material be exposed at the later contact location for the current shunting. In this manner, the carrier material can be continuously pasted with the cathode material, with the exposure of the contact locations for the later current shuntings being effected in a separate operation. This operation could also be eliminated if the dosing of the cathode material, as well as the pasting, are exactly coordinated to the individual cathode, so that a paste-free zone remains on the carrier material between the individual cathodes.

The cathode material is preferably removed by being washed off with water and/or in particular by being blown away with compressed air.

In a preferred specific embodiment of the inventive method, during compression the pressure is controlled by the thickness of the paste, so that a direct relationship exists between pressure, paste thickness, and the gap that is set in the pressing mechanism.

During compression of the pasted carrier material, the water that is contained in the cathode material is preferably absorbed in order to thereby accelerate the drying process for the cathode material.

Pursuant to a further specific embodiment of the present invention, after the compression, cathode material that extends to the sides beyond the carrier material is removed, whereby the cathode material that sticks out is, for example, scraped or cut off, so that on the whole the carrier material is provided with a precisely formed coating.

In order after the compressed, pasted carrier material has been cut into the appropriate cathode lengths to simplify the connection of the current shuntings, the strip-like cathodes are separated in an acceleration stretch after the cutting of the compressed, pasted carrier material.

Pursuant to a further specific embodiment of the inventive method, it is proposed that for the contacting of the current shuntings, the projecting lengths of the carrier material that are free of cathode material be folded over and the current shunting be squeezed between the fold and subsequently welded via spot welding or ultrasonic welding. In so doing, the current shuntings are preferably supplied from a supply roll and are cut to appropriate lengths. The thus produced cathodes can then be removed, for example via a vacuum suction mechanism, and can be introduced into a drying oven.

The apparatus of the present invention is characterized primarily by: an endless, continuously rotating conveyer belt means for the continuous transport of the carrier material, which is in a strip-like form, is unrolled from a supply roll, and rests upon the conveyer belt means; a feed mechanism for an automatic dosed or metered feeding of cathode material onto the carrier material; an automatically operating pasting mechanism that is disposed downstream of the feed mechanism; an automatically operating pressing mechanism that is disposed downstream of the pasting mechanism; a cutting device that is disposed downstream of the pressing mechanism and moves synchronously with the conveyer belt means during a cutting process, with the cutting device being provided for the automatic cutting of compressed, pasted carrier material to predetermined cathode lengths at locations thereof that have been exposed for the contacting of the current shuntings; and a contact mechanism that is disposed downstream of the cutting device and is provided for the automatic welding-on of the current shuntings.

By means of such an apparatus, cathodes can be fully automatically produced for dry-cell batteries, with the principal component being the pasting band that is in the form of the conveyer belt means and that rotates with constant speed, in the course of which the strip-like carrier material that is unrolled from a supply roll is uniformly transported through the overall apparatus, so that during this transport the individual manufacturing steps can be carried out. As a result, with modest expenditure for operating personnel, cathodes can be produced with great uniformity.

The conveyer belt means is preferably embodied as a toothed belt, with the outer surface being smooth and the underside being provided with two rows of teeth for driving the conveyer belt means.

In this connection, the underside of the conveyer belt means is preferably provided with support means to prevent sagging of the conveyer belt means. Rollers can be provided as the support means.

In order to be able to clean from the conveyer belt means cathode material that is adhering thereto when the conveyer belt means returns after a rotation to the starting position, a belt-cleaning mechanism, which can comprise, for example, a brush to which water is fed, is preferably associated with the returning underside of the conveyer belt means.

In order to be able to feed the cathode material to the carrier material in a dosed or metered manner, the feed mechanism for the cathode material is provided with a feed belt that extends transverse to the conveyer belt means and is provided for the cyclical supply of measured strips. In so doing, prepared cathode material is uniformly delivered to the feed belt, which ends directly over the conveyer belt means so that the measured strips fall down onto the same. The quantity of measured strips that are supplied depends upon the quantity of the material supply ahead of the pasting station, so that by means of an appropriate monitoring, control of the supply of measured strips can be undertaken.

To produce the measured strips, a cathode material cutting mechanism for the measured strips is preferably associated with the feed belt, with this mechanism preferably being provided with a pneumatically operated blade.

Pursuant to one preferred specific structural embodiment of the pasting mechanism, the same comprises a driven roller that rotates synchronously in the direction of transport of the conveyer belt means. This roller pastes the cathode material in and onto the carrier material in a technically straightforward and uniform manner.

In order to obtain a uniform paste thickness of constant density, the conveyer belt means is preferably supported below the roller so as to prevent sagging.

The roller of the pasting mechanism is preferably made of plastic and has a diameter of between 150 and 250 mm, preferably approximately 200 mm. The best pasting results are achieved in this manner.

In order to be able to infinitely adjust the pasting thickness, the roller is preferably disposed within the pasting mechanism in such a way that the height thereof can be adjusted.

In order to be able to later contact or connect the current shuntings to the carrier material, the contact location must be free of cathode material. For this reason, in a further specific embodiment of the present invention, a cleaning mechanism, which moves synchronously with the conveyer belt means during the cleaning process, is disposed between the pasting mechanism and the pressing mechanism; in conformity with the cathode length in the region of the cutting location, the cleaning mechanism automatically removes the (still wet) cathode material, and a specified length of the carrier material is exposed at the later contact location for the current shunts. The cleaning mechanism can be a wash head that can be lowered, whereby for short cathodes two or more wash heads can be disposed one after the other. A cleaning mechanism of this type can be dispensed with if the dosing of cathode material, as well as the pasting, can be coordinated exactly to the individual cathode, so that already from the beginning a zone that is free of paste remains on the carrier material between these individual electrodes.

The cleaning mechanism can preferably be supplied with water and/or compressed air, so that the cathode material can be removed in a technically straightforward manner.

Pursuant to one preferred specific embodiment of the present invention, the pressing mechanism comprises two continuously rotating belts that are disposed after a portion of the conveyer belt mean and that accommodate the pasted carrier material between them in a gap-like channel and compress the same, whereby an appropriate portion of the conveyer belt means for accommodating the previously compressed, pasted carrier material is disposed downstream of the thus-embodied pressing mechanism. With this pressing mechanism, the two belts are guided about drive and guide rollers, with the belts, in the vicinity of the gap-like channel, extending parallel and at a certain distance from one another in the direction of transport, so that the pasted carrier material is fixed in position and compressed over its length between the belts.

In this connection, the belts are preferably embodied as steel belts.

In order to prevent sagging of the belts of the pressing mechanism, these belts are supported from below. For example, to provide this support a plate can be disposed below the lower belt, with this plate being provided with a plurality of freely rotatable individual rollers. As a result, a uniform transfer of pressure, and hence the production of a uniformly compressed cathode, is possible.

In order to be able to absorb the water that is released from the cathode material during compression, it is proposed pursuant to a preferred specific embodiment of the present invention to dispose between the pasted carrier material and the two belts of the pressing mechanism respective paper strips that synchronously move along with the belts. In this connection, the paper strips can be unrolled from a supply roller, and after passing through the pressing zone can again be rolled up.

In order to be able to vary the gap between the belts of the pressing mechanism, the height of the pressing mechanism is preferably adjustable in order to adjust the pressure Pursuant to a further specific embodiment of the present invention, a device for removing the cathode material that projects to the side beyond the carrier material is disposed between the pressing mechanism and the cutting device This removal mechanism, can, for example, scrape off the projecting cathode material. However, in a preferred specific embodiment of the present invention, the removal mechanism is a cutting mechanism that is provided with a pair of cutter disks. In this way, a technically straightforward removal of the projecting cathode material is possible.

Pursuant to a further specific embodiment of the cutting device for producing the cathode strips, this device is controlled by sensors and is provided with a pneumatically driven blade.

It is finally proposed pursuant to another specific embodiment of the present invention that the conveyer belt means, in the zone following the cutting device, be embodied as an acceleration belt for separating the cut, strip-like cathodes. This acceleration belt provides a gap between the cathode strips, so that subsequently a straightforward connection of the current shuntings is possible. The thus separated cathode strips can then, for example, be transferred to a transverse transport system in order in this manner to be able to weld the current shuntings to the individual cathodes. A drying operation can then subsequently be effected in an appropriate oven.

Further specific features of the present invention will be described in detail subsequently.

DESCRIPTION OF PREFERRED EMBODIMENTS

Referring now to the drawings in detail, the inventive apparatus for producing cathodes for drycell batteries, especially lithium batteries, comprises several individual components that for operational and control purposes are interconnected.

The apparatus comprises a pasting belt in the form of a conveyer belt 1 that is embodied as a toothed belt and rotates continuously, via drive means 2, about guide rollers 3 that are provided at the ends. Successively associated with this conveyer belt 1 are a feed mechanism 4 for a pasty cathode material 5, a pasting mechanism 6, a cleaning mechanism 7, and, on the underside, two belt-cleaning mechanisms 8. Disposed after the conveyer belt 1 and its associated mechanisms is a pressing mechanism 9 that in turn is followed by a cutting mechanism 10. This is followed by a further conveyer belt 1', the speed of rotation of which is somewhat greater than that of the conveyer belt 1; consequently, the conveyer belt 1' is embodied as an acceleration belt. Associated with this conveyer belt 1' is a cutting device 11, which is finally followed by a contact mechanism 12.

Via the conveyer belts 1, 1', as well as the pressing mechanism 9 disposed between them, a strip-like carrier material 13 in the form of a metal mesh is transported through the apparatus in the direction of transport T, during the course of which it rests upon the conveyer belts 1, 1'. The carrier material 13 comes from a supply roll 14, with a number of these supply rolls being disposed in a container 15.

The feed mechanism 4 for the cathode material 5 comprises a feed belt 16 that extends transverse to the conveyer belt 1 and ends thereabove. The pasty cathode material 5, which is prepared at some other location, is manually supplied to this feed belt 16. In this connection, associated with the feed belt 16 is a cathode material cutting mechanism 17 that, for example, is provided with pneumatically operated cutters The previously supplied cathode material 5 is fed to the cutting mechanism 17, where the cathode material is cyclically cut into measured strips 18. These measured strips 18 are then cyclically delivered to the carrier material 13, which rests upon the conveyer belt 1 and is continuously transported thereby, with the measured strips 18 falling down onto the carrier material 13. The cyclical feeding is a function of the supply ahead of the subsequent pasting mechanism 6, and is correspondingly controlled, thereby achieving an automatic dosing or metering such that the apparatus is always supplied with that quantity of cathode material 5 that is required. In this connection, an appropriate sensor mechanism can be disposed ahead of the pasting mechanism 6 for emitting a pulse that permits the feed belt 16 to allow a new measured strip 18 to fall onto the carrier material 13.

Figure 1:
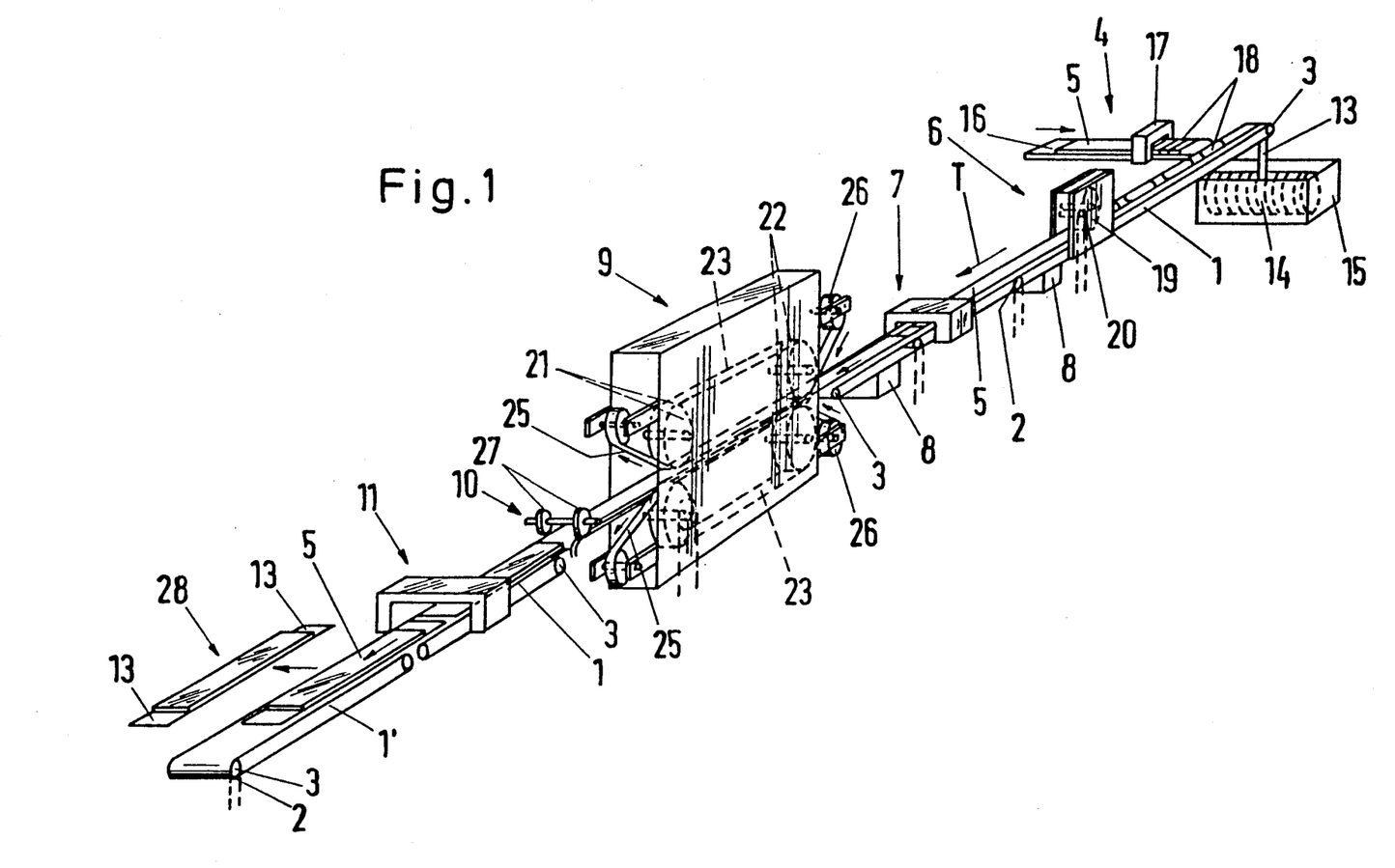
FIG. 1 is a view of one exemplary embodiment of the inventive apparatus for producing cathodes for dry-cell batteries via the inventive method.
Figure 2:
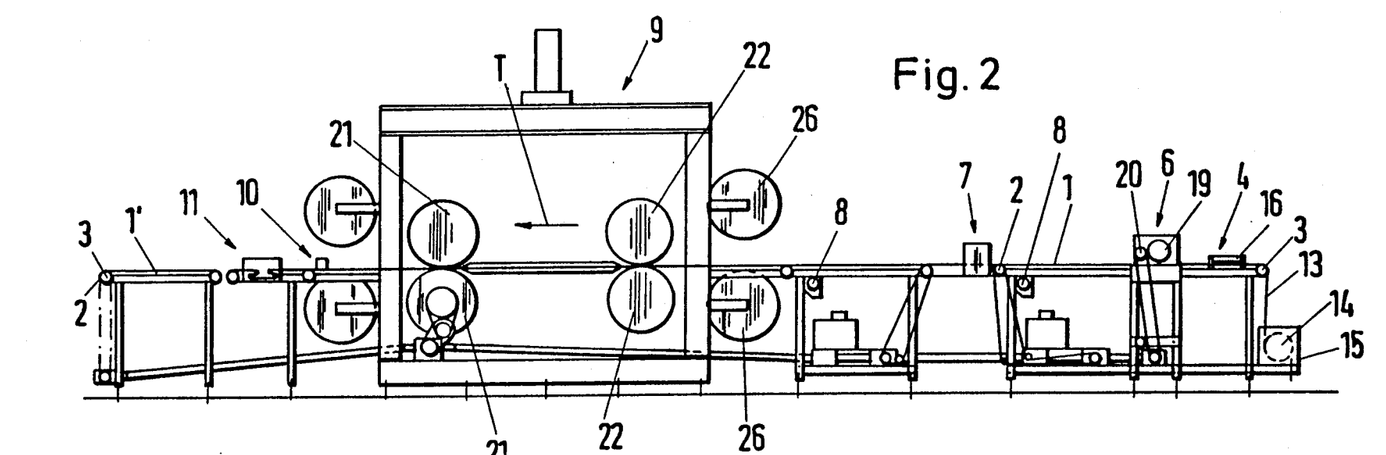
FIG. 2 is a side view of the apparatus of FIG. 1.
Figure 3:
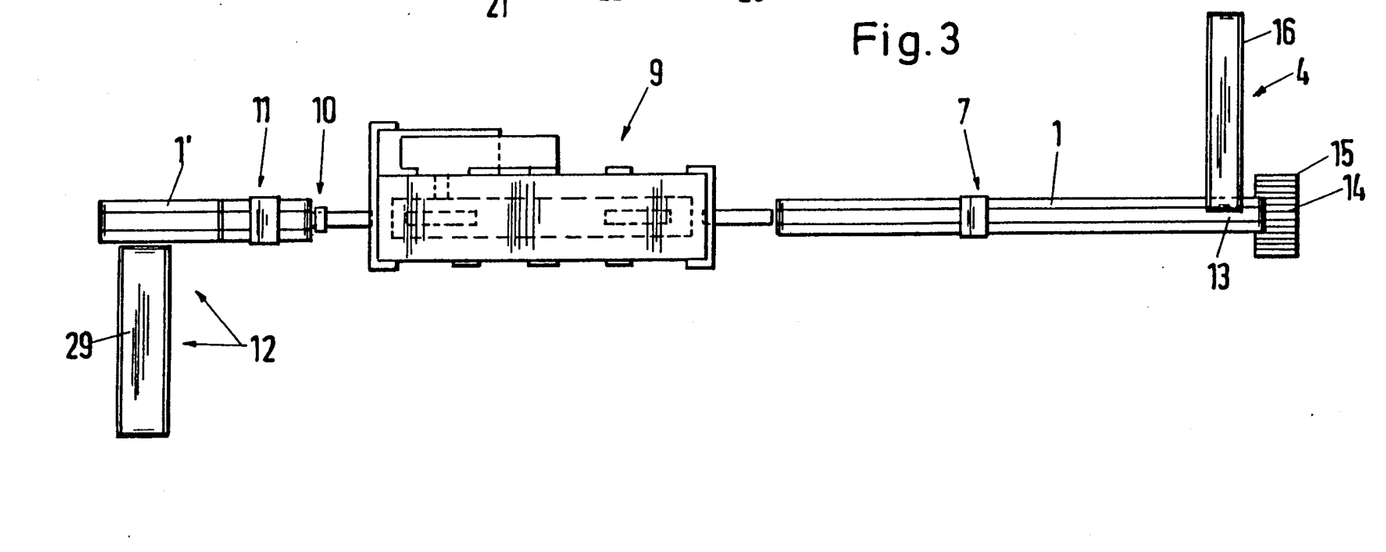
FIG. 3 is a plan view of the apparatus of FIG. 1.
Figure 4:
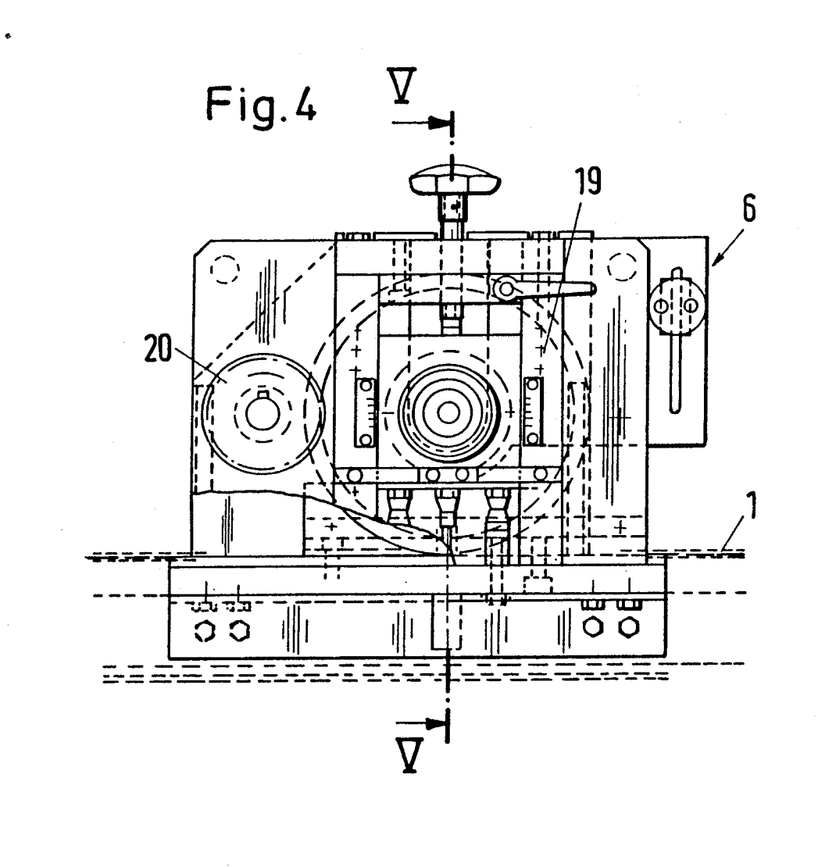
FIG. 4 is an enlarged side view of the pasting mechanism of the inventive apparatus.
Figure 5:
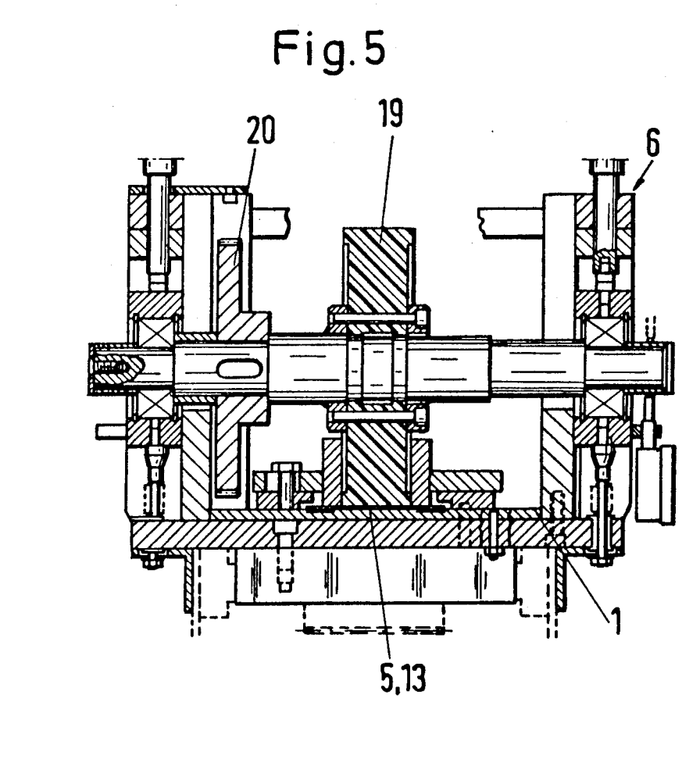
FIG. 5 is a cross-sectional view taken along the line V-V in FIG. 4.

The measured strips 18, which rest upon the carrier material 13 and are transported at a constant speed via the conveyer belt 1, are then supplied to the pasting mechanism 6, which is illustrated in detail in FIGS. 4 and 5. The pasting mechanism 6 is provided with a roller 19 that is driven by a gear wheel 20 in such a way that it rotates synchronously with the conveyer belt 1. In so doing, the roller 19 pastes the pasty cathode material 5 into and onto the carrier material 13. The roller 19 is preferably made of plastic and has a diameter of approximately 200 mm. In order to be able to infinitely adjust the thickness of the paste, the height of the roller 19 of the pasting mechanism 6 can be adjusted. In addition, the conveyer belt 1 is supported below the roller 19 so that it does not sag.

During the cleaning process, the cleaning mechanism 7 that is downstream from the pasting mechanism 6 operates synchronously with the conveyer belt 1, and hence synchronously with the carrier material 13, and has the purpose, at locations for the later contacting of a current shunting or derivation, of removing cathode material 5 from the carrier material 13 after previously in the pasting mechanism 6 a uniform cathode material strip was formed from the measured strips 18 and the carrier material 13. In this connection, the cleaning mechanism 7 can, for example, comprise wash heads that can be lowered and that are supplied with water and/or compressed air. In principle, a single wash head of this type is sufficient, although for short cathode lengths two or more wash heads can be provided.

Figure 6:
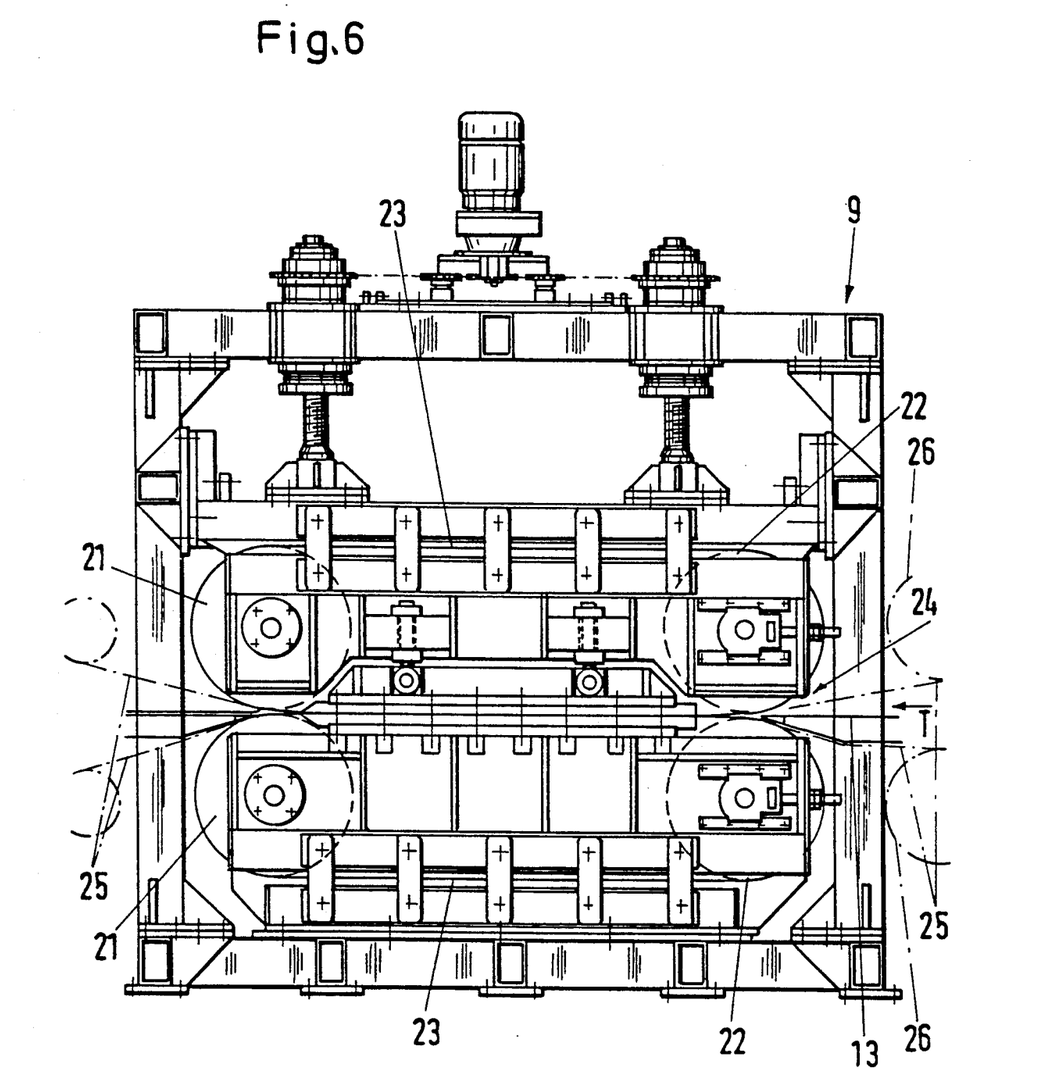
FIG. 6 is a side view of the pressing mechanism of the inventive apparatus.

The purpose of the belt-cleaning mechanism 8 that is disposed beneath the conveyer belt 1 is to clean dirt and adhering cathode material 5 from the conveyer belt 1, for example via brushes and water, before the conveyer belt again takes up the carrier material 13 in the starting position The pressing mechanism 9 that follows the conveyer belt 1 is shown in greater detail in Fig. 6. The pressing mechanism 9 comprises two endless steel belts 23 that are guided about drive rollers 21 and guide rollers 22. As a continuation of the conveyer belt 1, the belts 23 extend parallel to one another in the same direction of transport T and form between themselves a gap-like channel 24 for receiving the pasted carrier material 13, whereby for compression by the two belts 23, an appropriate pressure is exerted. The gap-like channel 24 between the two belts 23 can in this connection be adjusted, whereby the necessary pressure at a fixed gap is controlled by the paste thickness, i.e. there is a direct relationship between compression pressure, paste thickness, and gap adjustment. So that the two belts 23 exert a uniform pressure, they are each supported, whereby for this purpose respective pressure plates can be provided that in turn are provided with a plurality of freely rotatable individual rollers.

Furthermore associated with the pressing mechanism 9 are paper strips 25. During the compression, the paper, due to its absorptive capacity, has the task of absorbing water that is released from the cathode material 5. For this purpose, two paper supply rolls 26 are disposed upstream of the pressing mechanism 9 as viewed in the direction of transport T. The paper strips 25 are respectively guided through between the belt 23 and the pasted carrier material 13, and are transported further, synchronously with the belt 23, in order to be rolled up again behind the pressing mechanism.

The cutting mechanism 10, in the form of a pair of cutter disks 27, follows the pressing mechanism 9. The purpose of the cutting mechanism 10 is to cut off cathode material 5 that extends to the side beyond the carrier material 13.

Adjoining the cutting mechanism 10 is again the conveyer belt 1, with which is associated the cutting device 11, which operates synchronously with the conveyer belt 1 and has the purpose of severing the carrier material 13 in the vicinity of those locations where cathode material 5 has been removed in order in this manner to produce very specific lengths of individual cathodes 28. The cutting device 11 can have a pneumatically operated blade. The synchronous operation with the conveyer belt 1 can be established via a clamping mechanism. Similarly, the cleaning mechanism 7 can operate synchronously with the conveyer belt 1. Also associated with both mechanisms is a return device. The cutting device 11 is controlled by sensors.

Figure 7:
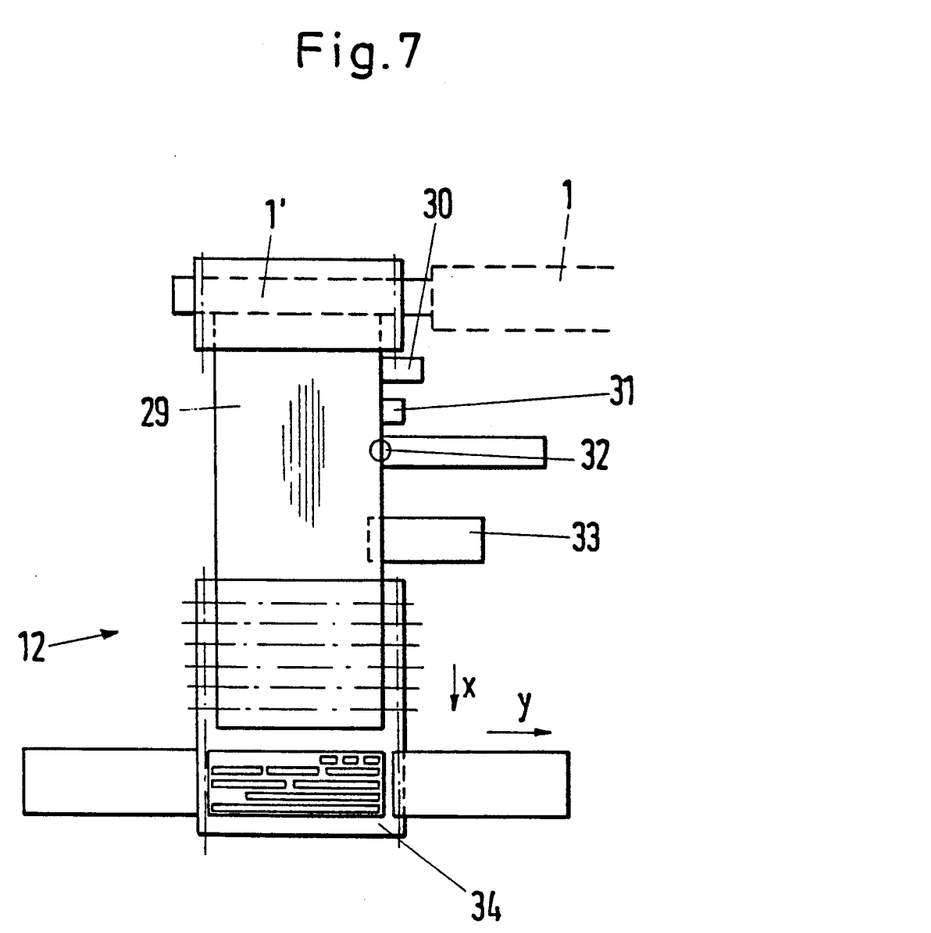
FIG. 7 is a view that illustrates the device of the inventive apparatus for welding the current shuntings to the cut cathodes.

Following the conveyer belt 1 is the conveyer belt 1', the transport speed of which is somewhat greater than that of the conveyer belt 1, so that the conveyer belt 1' assumes the function of an acceleration belt. This spaces the cathodes 28 that have been formed from one another so that they can be transferred via a vacuum suction apparatus to a transverse conveyer belt that is in the form of a plied belt; the contact mechanism 12 for contacting the cathodes 28 with the current shunting is associated with this transverse conveyer belt 29. In this connection, the cathodes 28 are first aligned in an alignment station 30, and the carrier material 13 is folded in a folding station 31. The feed station 32 for feeding current shuntings follows, whereupon in a subsequent welding station 33 the connection between the current shunting, which is, for example, in the form of a metal strip, and the metallic carrier material 13 is established via spot welding or ultrasonic welding. A certain number of the thus final manufactured cathodes 28 are then simultaneously placed upon a plate 34 from which the further processing can be effected.

By means of the inventive apparatus, cathodes, for example $MnO_2$ cathodes for lithium batteries, can be fully automatically produced with great uniformity and without great personnel effort.

The present invention is, of course, in no way restricted to the specific disclosure of the specification and drawings, but also encompasses any modifications within the scope of the appended claims.

What I claim is:

1. In a method of producing cathodes for dry-cell batteries, especially lithium batteries, including pasting a pasty cathode material on a metallic carrier material and subsequently compressing said cathode material therewith, and finally welding a current shunting to an end of said carrier material, the improvement comprising the steps of:

continuously unrolling a strip-like carrier material from a supply roll;

automatically feeding a dosed quantity of said pasty cathode material to said carrier material and subsequently pasting this cathode material onto said carrier material;

while continuously transporting said pasted carrier material further, automatically compressing same;

while still continuously transporting said pasted carrier material further, cutting same at a cut location to form predetermined cathode lengths;

finally automatically connecting said current shunting to said carrier material, with the further improvement of:

between said pasting and compressing steps, removing cathode material from said pasted carrier material, in conformity with the cathode length, in the vicinity of a given cut location to expose said carrier material to form a later contact location for said current shunting.

2. A method according to claim 1, which includes the step, after said step of cutting said compressed, pasted carrier material, of accelerating and separating said strip-like cathodes.

3. A method according to claim 1, which, for the connection of said current shuntings, includes the steps of: folding over lengths of said carrier material that are free of cathode material, squeezing a current shunting between a fold, and subsequently welding said current shunting via spot welding or ultrasonic welding 4. A method according to claim 3, which includes the steps of feeding said current shuntings from a supply roll and cutting them to appropriate lengths.

5. A method according to claim 1, in which said step of removing cathode material is effected by washing said cathode material off.

6. A method according to claim 1, in which said step of removing cathode material is effected by blowing said cathode material away.

7. A method according to claim 1, in which said step of removing cathode material is effected by washing said cathode material off and blowing said cathode material away.

* * * * *